United States Patent

Maisch

[11] Patent Number: 6,008,604
[45] Date of Patent: Dec. 28, 1999

[54] ELECTRIC MOTOR WHEEL BRAKE FOR VEHICLE

[75] Inventor: Wolfgang Maisch, Schwieberdingen, Germany

[73] Assignee: Robert Bosch GmbH, Stuttgart, Germany

[21] Appl. No.: 09/011,102

[22] PCT Filed: Apr. 18, 1996

[86] PCT No.: PCT/DE96/00676

§ 371 Date: Jan. 21, 1998

§ 102(e) Date: Jan. 21, 1998

[87] PCT Pub. No.: WO97/03869

PCT Pub. Date: Feb. 6, 1997

[30] Foreign Application Priority Data

Jul. 21, 1995 [DE] Germany ........................ 195 26 645

[51] Int. Cl.[6] ................................................ H02K 7/10
[52] U.S. Cl. ..................................... 318/362; 188/72.1
[58] Field of Search ............................ 188/71.7, 71.8, 188/72.1, 73.33; 180/242, 244; 303/112, 20, 189, 199; 318/362, 372

[56] References Cited

U.S. PATENT DOCUMENTS

| | | | |
|---|---|---|---|
| 4,327,414 | 4/1982 | Klein | 364/426 |
| 4,658,939 | 4/1987 | Kircher et al. | 188/156 |
| 4,685,745 | 8/1987 | Reinecke | 303/100 |
| 4,784,244 | 11/1988 | Carre et al. | 188/156 |
| 4,995,483 | 2/1991 | Moseley et al. | 188/162 |
| 5,234,262 | 8/1993 | Walenty et al. | 303/111 |

FOREIGN PATENT DOCUMENTS

| | | |
|---|---|---|
| 0 170 478 | 2/1986 | European Pat. Off. . |
| 0 129 969 | 11/1987 | European Pat. Off. . |
| 0 486 281 | 4/1995 | European Pat. Off. . |
| 3410006 | 9/1985 | Germany . |
| 3444301 | 6/1986 | Germany . |
| 92/21542 | 12/1992 | WIPO . |
| 94/24453 | 10/1994 | WIPO . |

Primary Examiner—Robert E. Nappi
Assistant Examiner—Rina I. Duda
Attorney, Agent, or Firm—Kenyon & Kenyon

[57] ABSTRACT

A wheel brake operated by electric motor for motor vehicles, where the operative braking forces and braking torques as well as the actuator control signals are determined for each wheel brake by appropriate measuring equipment. On the basis of these signals, implausible deviations are detected by comparison, and the faulty signal is recognized and treated appropriately by using the corresponding signals of the other wheel brake of the same and/or the additional axle(s).

9 Claims, 4 Drawing Sheets

ELECTRIC MOTOR WHEEL BRAKE FOR VEHICLE

FIELD OF THE INVENTION

The present invention relates to an electric motor wheel brake for motor vehicles.

BACKGROUND INFORMATION

Electric motor wheel brakes for motor vehicles are known. For example, World Patent No. WO-A 94/24453 describes a wheel brake where the brake application force is generated by an electric motor. If the brake system of a motor vehicle is composed of such electric motor wheel brakes, special attention must be devoted to reliable functioning of such a brake system to guarantee vehicular driving stability of the vehicle when braking in the partial braking range.

Therefore, the object of the present invention is to design a brake system of electric motor wheel brakes in such a way as to guarantee driving stability of the vehicle in braking and uniform brake wear.

SUMMARY OF THE INVENTION

A brake system with electric motor application of brake force is created to guarantee driving stability of the vehicle even in the partial braking range.

It is especially advantageous that this permits reliable and fault-tolerant determination of the braking torque and the braking forces on the wheels. This in turn leads to uniform brake wear in an advantageous manner.

Special advantages are achieved when using stepping motors or electronically commutated motors, where wear and tolerance effects can be compensated by adapting the point of brake application and brake release to gradual changes.

It is especially advantageous that a method of reliable monitoring of sensors for detecting the braking forces is provided with which a defective element can be detected.

DETAILED DESCRIPTION

Figure 1:
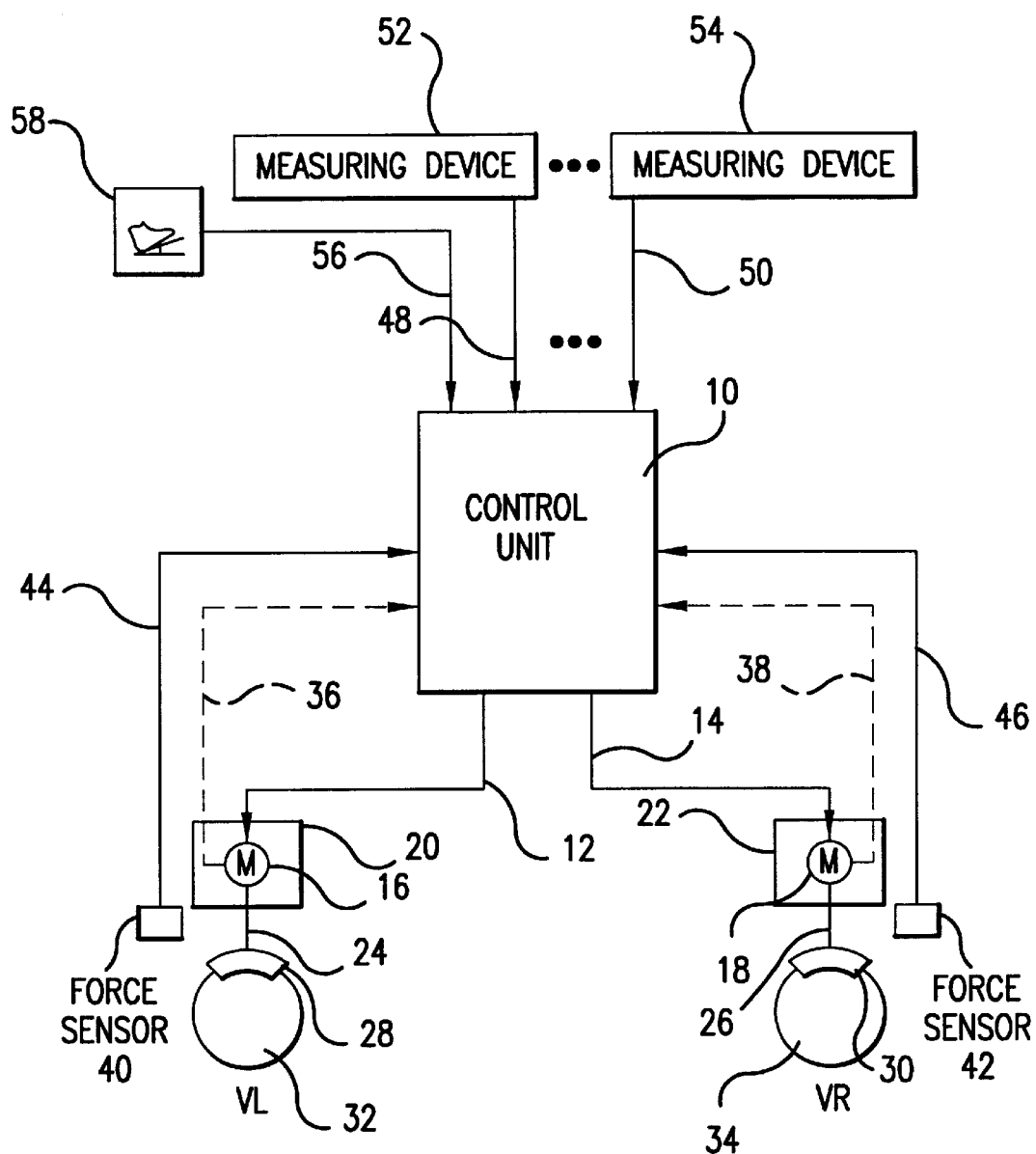
FIG. 1 illustrates a block diagram of a brake system according to an embodiment of the present invention with electric motor application of the brakes.

FIG. 1 shows a block diagram of a brake system of a motor vehicle with electric motor application of brake force on the example of an axle. This shows an electronic controller 10 that drives electric motors 16 and 18 over output lines 12 and 14. The electric motors are part of braking actuators 20 and 22 that act on braking elements 28 and 30 of wheels 32 and 34 respectively by way of mechanical connections 24 and 26. A similar arrangement is provided on additional axles of the vehicle. In the preferred embodiment, electric motors 16 and 18 are d.c. motors. In this case, as indicated with dotted lines, a quantity representing the current flowing through the motors is sent to control unit 10 over lines 36 and 38 respectively. This quantity is determined in a known way, e.g., by means of a resistor connected to ground in the H bridge output stage for the d.c. motor. Furthermore, there are force sensors 40 and 42 whose signals are sent to control unit 10 over lines 44 and 46. These force sensors determine the supporting forces of the braking actuators and in this way determine a measure of the operative braking forces and braking torques. In the preferred embodiment, these sensors are wire strain gauges. In other advantageous embodiments, the pressing force of the brake linings is detected by sensors (e.g., piezoelectric sensors), or the movement of the brake linings or an actuating lever of the wheel brake is determined (e.g., by displacement sensors) as an indirect measure of the braking force or the braking torques.

For the sake of thoroughness, FIG. 1 shows input lines 48 through 50 connecting control unit 10 to measuring devices 52 through 54. The latter detect additional operating quantities of the vehicle or the brake system, such as wheel speeds, the rotational speed of the drive unit, etc. which are necessary for controlling the brake system. Furthermore, an input line 56 is provided that connects control unit 10 to a measuring device 58 for detecting the driver's intent, in particular for detecting the position of a driver-operated brake pedal.

In an advantageous embodiment, stepping motors or electronically commutated motors are used instead of commutator d.c. motors. With such types of motors, detection and supply of the motor current are not performed because a corresponding quantity is available on the basis of the number of steps carried out.

Control unit 10 detects the driver's intent over line 56 and converts it to setpoints for the individual wheel brakes on the basis of a preprogrammed operating map for each wheel brake or groups of wheel brakes. These setpoints correspond, for example, to braking torques or braking forces which are to be set as part of a corresponding control circuit by driving the electric motors of the wheel brakes. In an advantageous embodiment, the driver's intent is correlated with the setpoints as a function of parameters such as axles loads, brake lining wear, brake temperature, tire pressure, etc., whose values are sent to control unit 10 over lines 48 through 50. Furthermore, in special braking states, control unit 10 performs the essentially known anti-lock functions or traction control functions on the basis of the wheel speeds supplied.

With such brake systems, where the wheel brakes are operated individually with an external force, it is important that the braking forces of the vehicle wheels are set with regard to driving stability so that the vehicle does not pull to one side and the brakes wear as uniformly as possible. It is therefore necessary for the braking forces or braking torques acting on the wheels to be detected. Since detection of these braking forces or braking torques has a direct influence on the braking action of the vehicle, it is important for the braking torques and braking forces to be determined reliably and in a fault-tolerant manner.

The basic idea of the procedure according to the present invention is for the electronic control unit for controlling the wheel brakes to receive information with regard to the operative braking torque or the operative braking force and information regarding the signals sent to the actuator. The latter information can be used to derive information regarding the operative braking torque or the operative braking force, so that two items of information are available for the braking torque and the braking force for each wheel brake.

Figure 2:
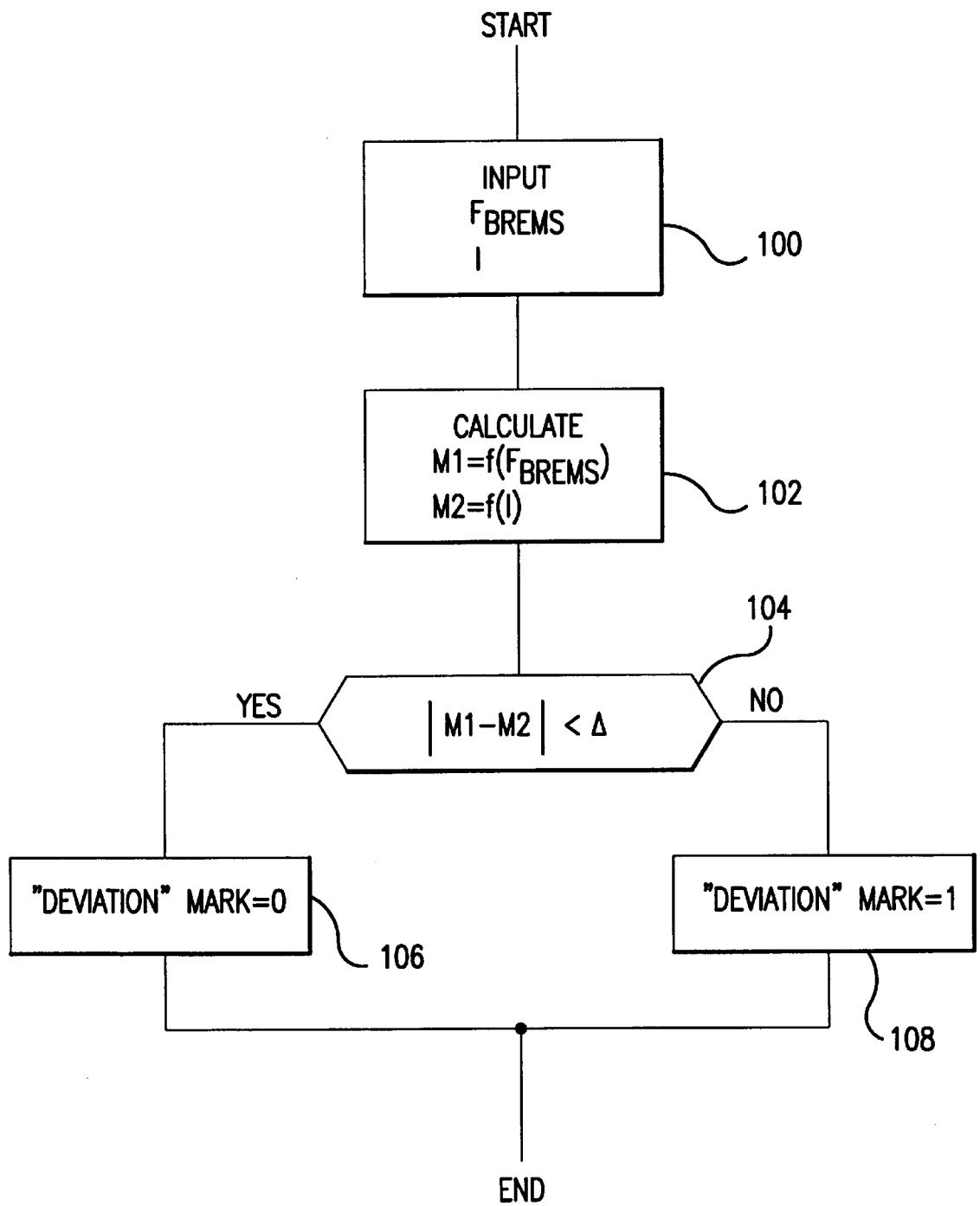
FIG. 2 illustrates a flow chart of an embodiment, according to the present invention, for determining the braking torque values formed at each wheel brake.
Figure 3:
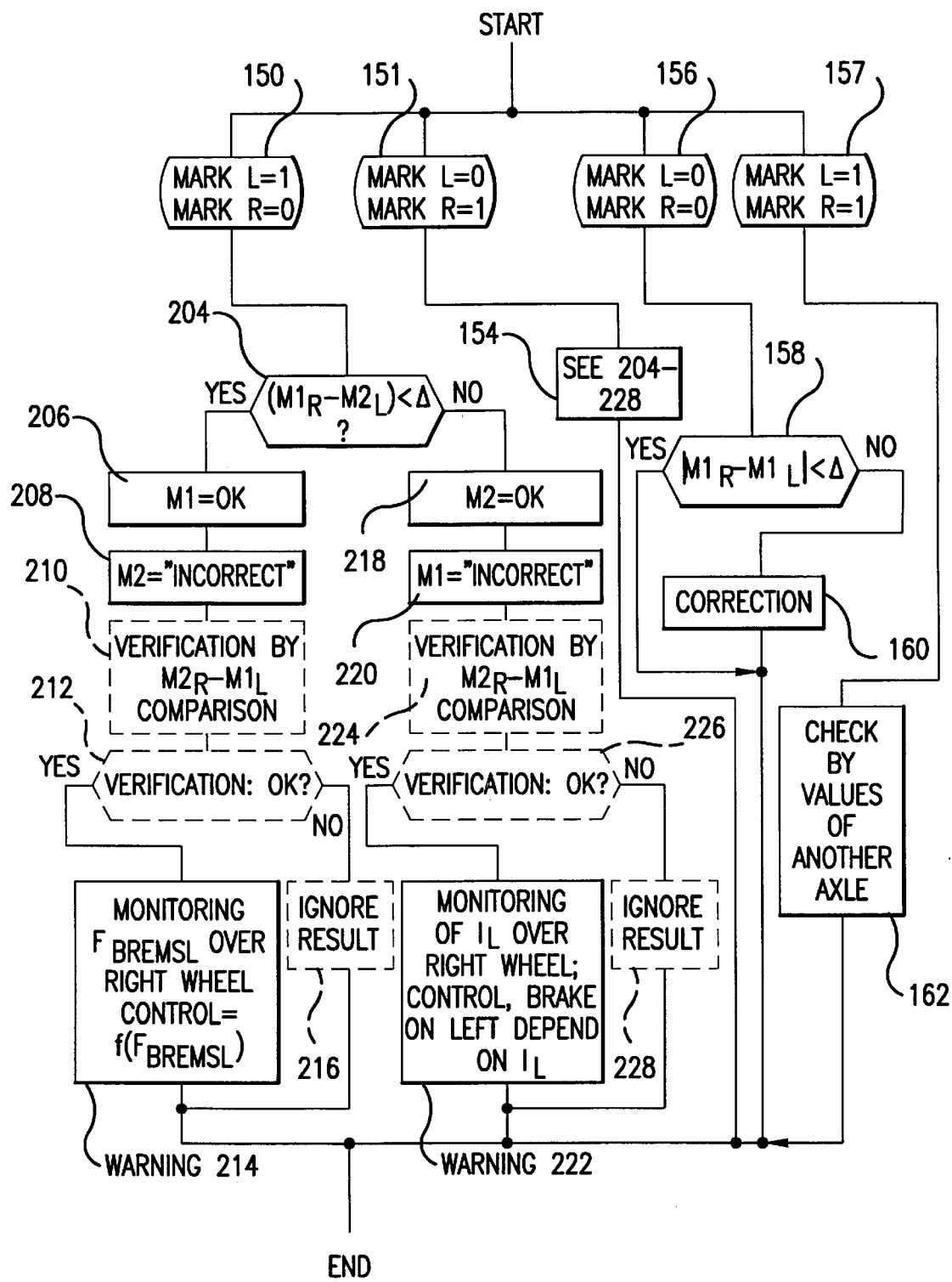
FIG. 3 illustrates a flow chart of an embodiment, according to the present invention, for comparing the braking torque values for wheel brakes on the same axle.

A preferred embodiment is illustrated on the basis of the flow charts in FIGS. 2 and 3. The basic idea of this procedure is that control unit 10 receives from each wheel brake a quantity determined by the force or motion sensor and receives a quantity representing the motor current or, in the case of stepping motors or electrically commutated motors, a quantity representing the number of steps. In an advantageous manner, the signal of a force or motion sensor is combined with the driving torque of the motor actuator for a wheel brake determined on the basis of the actuator-specific quantity. The two signal quantities are checked for implausible deviations. In addition, control unit 10 has access to the corresponding signal quantities of the wheels of the same axle and/or the other axle(s) in normal braking, apart from ABS braking or other special functions.

In other words, control unit 10 is enabled to determine unacceptable deviations from at least four signal quantities representing the same or a similar braking torque or the same or similar braking force (because in general the rear axle braking force is lower than the front axle braking force) and to make corrections when such unacceptable deviations occur or to determine which element is defective. This information is then converted to control commands for the wheel brakes (when there are deviations between the wheel brakes) and optionally a warning signal is delivered (when there are deviations within one wheel brake) or a wheel brake is influenced or even shut down if necessary.

The flow charts diagramed in FIGS. 2 and 3 give suggestions for implementing this basic idea in a computer program. The procedure according to FIG. 2 may also be used in an embodiment alone without the procedure diagramed in FIG. 3.

The subprogram illustrated in FIG. 2 is initiated at certain times during a braking operation. A braking operation is detected, for example, when a brake pedal switch closes. After the start of the subprogram, which is carried out for each wheel brake in succession, the signal values of the force sensor FBrems and the actuator-specific signal quantity I are entered in a first step 100. In the preferred embodiment, the braking force quantity is a measure of the supporting force of the brake actuator, while the actuator-specific quantity is the current flowing through the electric motor or the number of steps determined. In the subsequent step 102, the signal values supplied are converted into braking or driving torque values on the basis of characteristic curves. The supporting force detected by the force sensor corresponds to a braking torque value M1, taking into account the brake design, while the driving torque of the motor M2 is determined on the basis of the current or the number of steps using predetermined operating maps. In the next query step 104, the absolute value of the difference between these two torque values is compared with a preset tolerance value Δ. This value takes into account the tolerance in conversion of the measured values to torque values. If the value of the difference in torque values is less than the tolerance value, a "deviation" mark is set at the value 0 in step 106, while in the case of implausible deviations, when the value of the difference is greater than the tolerance value, the mark according to step 108 is placed at the value 1. Then the subprogram is terminated and optionally the subprogram shown in FIG. 3 is carried out.

The subprograms shown in FIGS. 2 and 3 may also be carried out with ABS and other special functions in addition to normal braking.

In the preferred embodiment, the subprogram shown in FIG. 3 is initiated following the subprograms according to FIG. 2. The torque values formed for each wheel brake are available. According to FIG. 3, different subprograms are initiated for the right and left wheel brakes of an axle, depending on the combination of values of the marks. For example, if an implausible deviation has been detected (MarkeL to 1), while no implausible deviation is detected for the right wheel of the same axle (MarkeR zero) (150), then the absolute value of the difference between the braking torque M1 on the right wheel and the driving torque M2 on the left wheel is formed in step 204 in the preferred embodiment and is compared with a preset tolerance value Δ. As explained above, this value takes into account tolerances in the area of the wheel brakes. If the absolute value of the difference is smaller than the tolerance value, it is assumed according to step 206 that the braking force detection on the left wheel is functioning properly, whereas according to step 208, the driving torque M2 determination on the left wheel might be incorrect. In a preferred embodiment, the torque value derived from the motor current is regarded as faulty according to step 214, the left wheel brake is controlled exclusively on the basis of the braking force signal and this signal is monitored according to step 204 by comparison with the torque value derived from the motor current or from the braking force value of the right wheel brake.

Furthermore, the driver is notified of the inconsistency by a warning signal.

However, an advantageous supplementary measure yields the possibility of verifying the result of steps 206 and 208, because four quantities indicating the same torque are obtained on one axle. Therefore, in an advantageous embodiment, the torque value derived from the motor current or the number of motor steps for the right wheel is compared with the torque value derived from the braking force detected on the left wheel. If the result of steps 206 and 208 is confirmed in query step 212, the measures described above are initiated according to step 214. If the verification does not confirm the result of steps 206 and 208, the result is first ignored according to step 216 and an error message is generated when several inconsistencies occur in succession in an advantageous embodiment. Then the subprogram is terminated and is repeated in conjunction with FIG. 2.

If it was determined in query step 204 that the absolute value of the difference between the two values is greater than the preset tolerance range, then it is assumed according to step 218 that the torque value that has been derived from the motor current is correct, and according to step 220, the torque value derived from the braking force detected is incorrect. In the preferred embodiment, this leads according to step 222 to controlling the left wheel brake as a function of the torque value derived from the motor current. This torque value is monitored on the basis of the corresponding values for the right wheel, where if there are inconsistencies, the faulty signal can again be determined and isolated in this case on the basis of a two-of-three selection. Furthermore, here again a warning signal is generated. According to steps 210, 212 and 216, it is advantageous to verify the results on the basis of a comparison of the torque value derived from the motor current for the right wheel with the torque value derived from the braking force for the left wheel according to steps 224, 226 and 228.

If the mark of the left wheel brake is zero and that of the right wheel brake is 1 (151), the steps corresponding to steps 204 to 228 are carried out according to step 154.

If both marks have a value of zero (156), a correct determination of the braking torques on the wheel brakes of an axle can be assumed. There remains, however, some uncertainty with regard to deviations between the wheel brakes that can be attributed to different brake lining wear, tire pressures and tire wear, aging phenomena, etc. therefore, in query step 158 in the preferred embodiment, the brake torque on the left wheel is compared with that on the right. If the absolute value of the difference is within a tolerance range, this ensures that the torque detection is correct. If the absolute value of the difference is outside the tolerance range, the control signal preferably for the wheel brake with the lower torque value is corrected according to step 160 to make the torque values on the right and left wheel brakes coincide. In the preferred embodiment, this is done by correcting the setpoint; in other embodiments this can also be done by correction of the measurement signal (actual value). The subprogram is terminated after step 158 or 160.

If both marks have a value of 1 (157), i.e., if implausible deviations have occurred on both wheel brakes of one axle, the faulty signals are determined according to step 162 as in the procedure according to FIG. 2 and steps 150 through 160 and 204 through 228 by comparison with the signals of another axle (optionally with wider tolerances), preferably the signals of the wheel brakes of different sides of the vehicle.

A subprogram corresponding to the subprogram according to FIG. 3 is run for the other axles of the vehicle.

With the procedure described here, information about the braking torque and braking force from measured signals and sent signals (actuator) is compared with minimal extra expense, so that in the case of partial braking, four signal values from two wheels on the same axle are compared for implausible deviations. If the signal reliability is to be further reinforced, similar signal values are also available from the wheel brakes of the other axles of the vehicle. Signal reliability can therefore be additionally reinforced by comparison with these signal values, optionally with a wider tolerance range.

In addition to the method presented here, a comparison of the torque values derived from the braking force values or the torque values derived from the motor currents is also advantageous in steps 204, 158, etc. in other advantageous embodiments.

In addition to the use of the motor current to determine the driving torque, the number of steps executed SZ is used as a measure of the driving force and thus for the braking force in an advantageous embodiment when using stepping motors or electrically commutated motors.

In contrast with the use of the motor current, however, the following special case occurs here. When using such brake application devices, the point of brake application and release shifts with respect to the number of steps because of wear in particular. Therefore, this point of application or release must be determined continuously in conjunction with the determination of braking force and braking torque. This is done through the subprogram outlined in FIG. 4. The determination of the application point can also be used with commutator motors.

Figure 4:
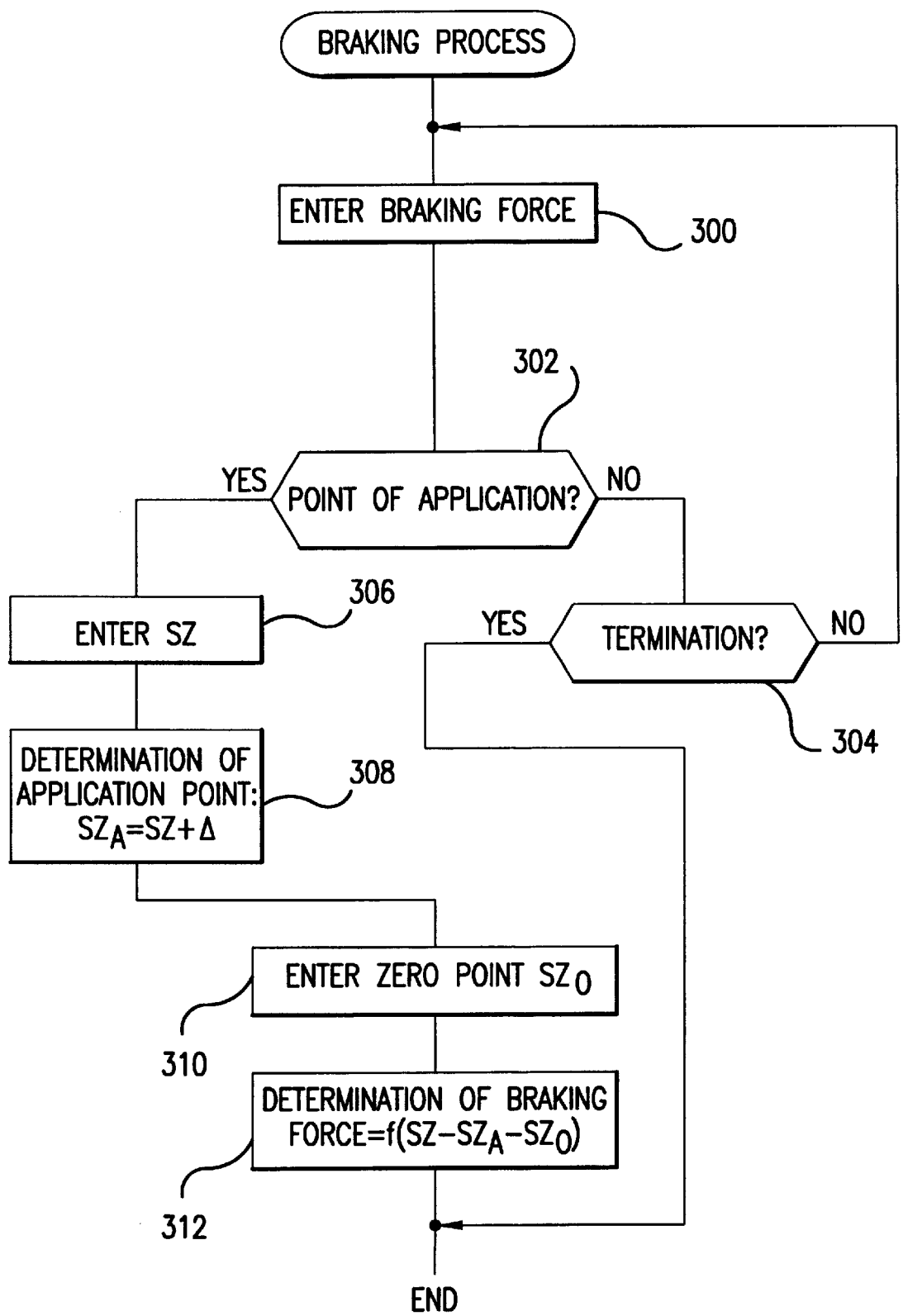
FIG. 4 illustrates a method, according to an embodiment of the present invention, for adapting the point of application and release of the brakes to gradual changes when using stepping motors or electronically commutated motors.

When initiating a braking operation, the subprogram shown in FIG. 4 is run through at least once per operating cycle. The brake control is activated by operating the brake pedal and a braking actuation as per the driver's input is initiated by control unit 10. According to FIG. 4, to determine the application point, the applied braking force and the control quantity are entered while this braking control operation is taking place. In the next step 302, the application point of the wheel brake is determined on the basis of the relationship between the braking force and/or the control quantity. For this purpose, the braking force value thus entered is compared with a preset limit characterizing actuation of the brake. In other advantageous embodiments, a break in the braking force curve is used to detect the application point, or the application point is extrapolated (braking force 0) on the basis of the relationship between braking force and control quantity (characteristic curve). If the application point is not detected in step 302, a check is performed in step 304 to determine whether the subprogram is to be terminated. For example, this is the case when the application point is not detected during a predetermined period of time or the braking operation has been terminated. If the termination condition does not exist, the subprogram is repeated with step 300.

If the application point is detected in step 302, then in step 306, the prevailing step count SZ or current value at the moment is detected, and in step 308 the application point of the brake SZA is stored on the basis of the step count SZ entered and optionally a tolerance value Δ. Then in step 310, the zero point of the step counter when the brake is released and the brake pedal is released (driver's intent zero) SZ0 is entered, and in step 312 and in the control program, the braking force is derived from the instantaneous step count SZ, from which the application point SZA and zero point SZ0 are subtracted.

A similar procedure is followed to determine the release point.

What is claimed is:

1. A braking element with an electric motor brake of a motor vehicle having at least two wheels, comprising:
   an electric motor actuating element for each of at least two wheel brakes the electric motor actuating element including at least one electric motor and an actuator;
   a controlling system coupled to the electric motor actuating element, the controlling system activating the electric motor actuating element via triggering signals,
   the controlling system receiving from a measuring device first quantities corresponding to one of braking torques and braking forces acting on the at least two wheels, and receiving from the electric motor actuating element second quantities influenced by the controlling system, the second quantities representing the one of braking torques and braking forces acting on the at least two wheels,
   the controlling system including an arrangement detecting unacceptable deviations between the one of braking torques and braking forces by comparing the first and second quantities, and determining an error status as a function of the unacceptable deviations.

2. The braking element according to claim 1, wherein the measurement device includes at least one of i) measurement equipment which detects a supporting force of the actuating element, ii) measurement equipment which detects a pressing force of brake linings, and iii) measurement equipment which detects a movement of one of the brake linings and an actuating lever of the wheel brakes.

3. The braking element according to claim 1, wherein the second quantities include at least one of a triggering signal quantity supplied to the actuating element, a current flowing through the at least one electric motor of the actuating element, and a number of steps of the at least one electric motor.

4. The braking element according to claim 1, wherein, when the unacceptable deviations are detected, a comparison is performed on a basis of two quantities with corresponding quantities of a wheel brake on a same axle to determine a faulty quantity.

5. The braking element according to claim 1, wherein unacceptable deviations are detected by comparisons based on the first quantities and the second quantities of the wheel brakes of different axles.

6. The braking element according to claim 5, wherein a test for the unacceptable deviations in a normal braking is performed without an intervention of a stop control system, other additional information, an ABS control, and other special functions.

7. The braking element according to claim 1, wherein at least one of a prevailing point of application and a point of release is determined by the controlling system from a relationship between one of the second quantities and an operative braking force.

8. The braking element according to claim 1, wherein, when an error is detected, a faulty quantity is determined and a brake system is switched off with regard to a remaining control.

9. The braking element according to claim 8, wherein, when the error is detected, the faulty quantity is determined and a comparison for the unacceptable deviations with the faulty quantity at one of the wheel brakes is derived from a corresponding quantity of another of the wheel brakes of a same axle and a remaining correct quantity of the one of the wheel brakes.

* * * * *